United States Patent [19]

Mitsche

[11] 3,943,070

[45] Mar. 9, 1976

[54] MANUFACTURE OF SPHEROIDAL ALUMINA PARTICLES

[75] Inventor: Roy T. Mitsche, Island Lake, Ill.

[73] Assignee: Universal Oil Products Company, Des Plaines, Ill.

[22] Filed: Oct. 15, 1974

[21] Appl. No.: 514,535

[52] U.S. Cl. ............... 252/448; 252/463; 252/317; 423/628; 423/631; 423/625
[51] Int. Cl.² ..................... C01F 7/00; B01J 37/00
[58] Field of Search................. 423/625, 628, 631; 252/463, 317, 448

[56] References Cited
UNITED STATES PATENTS

| | | | |
|---|---|---|---|
| 2,666,749 | 1/1954 | Hoekstra | 423/628 |
| 2,968,537 | 1/1961 | Nixon | 423/628 |
| 3,027,234 | 3/1962 | Muhalko | 252/448 X |
| 3,346,336 | 10/1967 | Hayes | 242/448 |
| 3,558,508 | 1/1971 | Keith et al. | 252/448 X |
| 3,642,660 | 2/1972 | Mitschi | 252/448 X |

*Primary Examiner*—Herbert T. Carter
*Attorney, Agent, or Firm*—James R. Hoatson, Jr.; Robert W. Welch; William H. Page, II

[57] ABSTRACT

A method of manufacturing high surface area spheroidal alumina particles. A finely divided eta alumina is admixed and suspended in an alumina hydrosol and the mixture thereafter converted to spheroidal particles comprising eta and gamma alumina by the oil-drop method. The alumina spheres are particularly useful as a high surface area support or carrier material for catalytic components, and as a high surface area adsorbent.

9 Claims, No Drawings

MANUFACTURE OF SPHEROIDAL ALUMINA PARTICLES

This invention relates to the manufacture of spheroidal alumina particles. Alumina, as porous aluminum oxide in either the anhydrous form or any of the various hydrous forms, is widely employed in the chemical and petroleum industries. In particular, the activated aluminas designated as gamma and eta alumina have been widely employed by the petroleum industry as a catalyst, or as a high surface area support for catalytic materials, to catalyze various hydrocarbon conversion reactions.

While the structural formulae of gamma alumina and eta alumina are essentially the same, the actual structures are substantially different. This is evidenced by the fact that gamma alumina, produced by high temperature calcination of boehmite alumina, exhibits a surface area generally in the range of from about 160 to about 225 square meters per gram, while eta alumina, produced by the high temperature calcination of bayerite alumina, has a surface area generally in the range of from about 250 to about 400 square meters per gram.

Those skilled in the art of catalysis will recognize that an alumina with a surface area in the range of from about 250 to about 350 square meters per gram is in many instances more desirable than an alumina with a surface area in the 160–225 square meter per gram range when utilized as an adsorbent, as a catalyst, or as a carrier material for one or more catalytic components. The former has a significantly greater adsorption capacity per unit weight than the latter and, when utilized as a carrier material in the manufacture of catalytic composites, possesses a higher intrinsic activity as well as a greater tendency to retain catalytic activators such as halogen during processing.

When utilized as a catalyst, or as a catalyst support or carrier material, spheroidal alumina particles offer numerous advantages. When employed in a reaction or contact zone as a fixed bed, the spheroidal particles permit more uniform packing to reduce variations in pressure drop across the bed, and the tendency of the reactant stream to channel through the bed and by-pass a portion of the catalyst is thereby reduced. When employed in a moving bed type of operation, e.g., wherein the particles gravitate through a reaction zone, or are transported from one zone to another by the reactant stream or an extraneous carrying media, the spheroidal particles have a further advantage in that there are no sharp edges to erode or break off with the formation of fines which tend to plug the process equipment.

Spheroidal alumina particles of substantially uniform size and shape are advantageously prepared by the method whereby an acidic alumina hydrosol is commingled with a gelling agent at below gelation temperature, and the mixture dispersed as droplets in a water-immiscible suspending media, usually a gas oil, maintained at an elevated temperature whereby the hydrosol droplets are formed into firm hydrogel particles. The method, commonly referred to as the oil-drop method, is described by Hoekstra in U.S. Pat. No. 2,620,314. The method requires a gelling agent which has the ability to effect a progressive neutralization of the acidic hydrosol over a given time interval permitting the droplets to be drawn into spheres before the gelation stage is reached. Conventional gelling agents such as ammonium hydroxide are inoperable since they produce immediate gelation of the acidic hydrosol as a result of which spherically shaped particles cannot be formed. In this regard, acceptable gelling agents include weak bases having a strong buffering action. An ammonia precursor such as hexamethylenetetramine, urea, or mixtures thereof, which is substantially stable at normal temperatures but decomposable or hydrolyzable to ammonia with increasing temperature, is suitably employed.

Only a fraction of the ammonia precursor is initially hydrolyzed to ammonia to effect a partial neutralization of the acidic hydrosol droplets and the formation of firm spheroidal particles. Typically, the particles are retained and aged in the hot oil suspending media for an extended period. During the aging process, the residual ammonia precursor retained in the particles continues to hydrolyze and further neutralize the spheroidal particles. The aging process is considered as essential to obviate excessive cracking and sphere disintegration during the subsequent waterwash treatment for the separation of soluble salts. However, the practice also promotes the formation of crystalline boehmite alumina which, upon calcination at 370°–650° C., is invariably transformed to gamma alumina.

It is an object of this invention to present a method of manufacturing high surface area spheroidal particles comprising eta alumina and gamma alumina utilizing the oil-drop method.

In one of its broad aspects, the present invention embodies a method of manufacturing spheroidal alumina particles which comprises admixing and suspending a finely divided eta alumina in an acid anion-containing alumina sol having an alumina/acid anion ratio of from about 1:1 to about 1.5:1, said alumina being admixed with said sol in an amount to provide from about 20 to about 50 wt. % of the final alumina product; commingling the resulting sol with an ammonia precursor at below gelation temperature, said ammonia precursor being decomposable to ammonia with increasing temperature; dispersing the mixture as droplets in a hot oil bath effecting decomposition of said ammonia precursor and the formation of hydrogel spheres therein; aging the spheres at an elevated temperature effecting decomposition of the residual ammonia precursor contained therein, and washing, drying and calcining the aged spheres.

Other objects and embodiments of this invention will become apparent in the following detailed specification.

In accordance with the present invention, a finely divided eta alumina, such as is prepared by the high temperature calcination of beta alumina trihydrate (bayerite), is initially admixed and suspended in an acid anion-containing alumina sol. The expression "finely divided" is intended as descriptive of particles having an average diameter of less than about 150 microns, for example, particles which are recoverable through a 105 micron microsieve.

The alumina hydrosol employed herein is described as an acid anion-containing hydrosol having an aluminum/acid anion ratio of from about 1:1 to about 1.5:1. The alumina sols herein contemplated are such as are prepared by the general method whereby a suitable acid salt of aluminum, such as aluminum chloride, aluminum sulfate, aluminum acetate, etc., is subjected to hydrolysis in aqueous solution and the solution treated at conditions to reduce the resulting acid anion concentration thereof, as by neutralization, and achieve the aforesaid aluminum/acid anion ratio. Thus, the reduced acid anion concentration promotes olation and formation of inorganic polymers of colloidal dimension dispersed and suspended in the remaining liquid.

Reduction in the acid anion concentration can be effected in any conventional or otherwise convenient manner. For example, the acid anion concentration can be reduced utilizing aluminum metal as a neutralizing agent. In this case, the salt of neutralization is an aluminum salt subject to hydrolysis and ultimate sol formation. In some cases, as in the case of aluminum acetate, where the acid anion is sufficiently volatile, the desired acid anion deficiency may be created simply by heating. Another method of producing a suitable alumina hydrosol is in the electrolysis of an aluminum salt solution, for example an aqueous aluminum chloride solution, in an electrolytic cell having a porous partition between anode and cathode whereby an acid anion deficiency is effected in the cathode compartment with the formation of an alumina hydrosol therein.

Preferably, the acid anion-containing alumina hydrosol is an aluminum chloride hydrosol variously referred to as an aluminum oxychloride hydrosol, aluminum hydroxy chloride hydrosol, and the like, such as is formed utilizing aluminum metal as a neutralizing agent in conjunction with an aqueous aluminum chloride solution. The aluminum chloride hydrosol is typically prepared by digesting aluminum in aqueous hydrochloric acid and/or aluminum chloride solution at about a reflux temperature, usually from about 175° to about 220° F. and reducing the chloride anion concentration of the resulting aluminum chloride solution by the device of maintaining an excess of aluminum reactant in the reaction mixture as a neutralizing agent. In any case, the aluminum chloride hydrosol is prepared to contain aluminum in from about a 1:1 to about a 1.5:1 ratio with the chloride anion content thereof.

Pursuant to the present invention, the eta alumina is admixed with the acid anion-containing alumina hydrosol to provide from about a 20 to about 50 wt. % of the final alumina product. One preferred method of admixing the eta alumina with the alumina hydrosol is to prepare the eta alumina as an aqueous slurry and add the same to the hydrosol slowly and with stirring. The alumina-alumina hydrosol mixture is then commingled with an ammonia precursor at below gelation temperature and dispersed as droplets in a water-immiscible suspending medium substantially in accordance with the aforementioned oil-drop method of Hoekstra as described in U.S. Pat. No. 2,620,314. Thus the alumina-alumina hydrosol mixture is cooled to below gelation temperature, commingled with an ammonia precursor which is hydrolyzable or decomposable to ammonia with increasing temperature, and the mixture dispersed as droplets in a hot, water-immiscible suspending medium, suitably in an oil suspending medium maintained at from about 120° to about 220° F., whereby said hydrolysis or decomposition occurs with the formation of firm spheroidal hydrogel particles. The ammonia precursor is preferably hexamethylenetetramine although other weakly basic materials, including urea alone or in combination with hexamethylenetetramine, which are substantially stable at below gelation temperature but hydrolyzable to ammonia with increasing temperature, may be employed. The hexamethylenetetramine, or other ammonia precursor, is utilized in an amount sufficient to effect substantially complete neutralization of the chloride or other acid anion content in the hydrosol upon total hydrolysis. Preferably, hexamethylenetetramine is utilized in an amount equivalent to form about a 1:4 to about a 1.25:4 mole ratio with said chloride. The hexamethylenetetramine is preferably separately prepared in aqueous solution and thereafter commingled with the eta alumina-alumina hydrosol mixture. The hexamethylenetetramine aqueous solution suitably comprises from about 28 to about 40 wt. % hexamethylenetetramine. As heretofore mentioned, only a fraction of the ammonia precursor is hydrolyzed or decomposed to ammonia in the relatively short period during which initial gelation occurs. During the subsequent aging process, the residual ammonia precursor retained in the spherical gel particles continues to hydrolyze and effect further polymerization of the alumina. The spherical particles are aged, preferably in the alkaline oil bath, at a temperature of from about 120° to about 500° F. and at a pressure to maintain the water content of said particles in a substantially liquid phase. Preferably, the hydrogel particles are aged at a temperature of from about 120° to about 350° F. and at a pressure of from about 40 to about 150 psig whereby the water content of the particles is maintained in a substantially liquid phase. The spheroidal particles are suitably aged at the described conditions of temperature and pressure within a period of from about 1 to about 5 hours.

After the aging treatment, the spheres are washed in any suitable manner. A particularly satisfactory method is to wash the spheres by percolation, either with an upward or downward flow of water, and preferably with water containing a small amount of ammonium hydroxide and/or ammonium nitrate. After washing, the spheres may be dried at a temperature of from about 200° to about 600° F. for 2 to 24 hours or more, or dried at this temperature and calcined at a temperature of from about 800° to about 1400° F. for 2 to 12 hours or more, and utilized as such or composed with other catalytic components. It is preferred that the spheres be dried slowly and also that the drying be effected in a humid atmosphere since this has been found to result in less breakage of the spheres.

As heretofore mentioned, the spheroidal alumina particles of this invention are useful as a high surface area support or carrier material for catalytic components. The spheroidal alumina particles are particularly useful as a support or carrier material for platinum, or other platinum group metal, in the catalytic reforming of gasoline boiling range feed stocks to improve the octane rating thereof. Reforming conditions herein contemplated include an imposed pressure of from about 100 to about 1000 psig and a temperature of from about 800° to about 1100° F. A hydrogen rich gas, principally a recycle gas comprising in excess of about 80% hydrogen, is admixed with the hydrocarbon charge stock to provide a hydrogen/hydrocarbon mole ratio of about 2 to about 20. The hydrocarbon charge stock in admixture with hydrogen is generally preheated to the desired reaction temperature and passed into contact with the catalyst contained in a reaction zone. The hydrocarbon charge stock is passed in contact with the catalyst at a liquid hourly space velocity (LHSV) of from about 0.5 to about 10, an LHSV of from about 1.0 to about 4.0 being preferred. The reaction zone effluent is recovered in a high pressure-low temperature receiver or separator whereby a hydrogen-rich gaseous phase is separated and recycled, in part, to the reaction zone in admixture with the hydrocarbon charge thereto.

Although the spheroidal alumina particles of this invention are particularly suitable for reforming, they may be used to promote other reactions including dehydrogenation of specific hydrocarbons or hydrocarbon fractions, isomerization of specific hydrocarbons or hydrocarbon fractions, destructive hydrogenation or hydrocracking of larger hydrocarbon molecules such as those occurring in the kerosine and gas oil boiling range, and the oxidation of hydrocarbons to produce first, second, and third stage oxidation products. Reaction conditions employed in the various hydrocarbon conversion reactions are those heretofore practiced in the art. For example, alkyl aromatic isomerization reaction conditions include a temperature of from about 32° to about 1000° F., a pressure of from about atmospheric to about 1500 psig, a hydrogen to hydrocarbon mole ratio of from about 0.5:1 to about 20:1, and a LHSV of from about 0.5 to about 20. Likewise, typical hydrocracking reaction conditions include a pressure of from about 500 psig to about 3000 psig, a temperature of from about 390° to about 935° F., a LHSV of from about 0.1 to about 10, and a hydrogen circulation rate of from about 1000 to about 10,000 SCF/BBL (standard cubic feet per barrel of charge).

The following examples are presented in illustration of the method of this invention and are not intended as an undue limitation on the generally broad scope of the invention as set out in the appended claims.

EXAMPLE I

An alumina comprising 75% eta alumina and having a surface area of 421 square meters per gram, an average pore volume of 0.32 cubic centimeters per gram, and an average pore diameter of 30 Angstroms was ground to a fine powder and admixed with an alumina hydrosol. The alumina hydrosol was prepared by digesting aluminum pellets in aqueous hydrochloric acid at about 215° F. while maintaining an excess of the aluminum reactant in the reaction mixture. During the digestion process the reaction mixture was stirred until sufficient alumina was digested to yield a hydrosol containing 14.20 wt. % aluminum. The hydrosol had a specific gravity of 1.403, an aluminum/chloride ratio of 1.15, and contained 9.57 wt. % Cl. The eta alumina was admixed with the hydrosol in an amount to provide 25 wt. % of the total alumina product. About 1 liter of a 28% aqueous hexamethylenetetramine solution was admixed with the alumina-alumina hydrosol mixture, and the resulting mixture was continuously stirred until dispersed as droplets in a column of hot oil maintained at 200°F. The resulting spheres were aged in the hot oil for about 18 hours, and then for about 4 hours in 3% aqueous ammonium hydroxide solution at 203° F. The aged spheres were then water-washed, dried at 212° F., and calcined in air at 1200° F. for 2 hours. The calcined product had a surface area of 248 square meters per gram, an average pore volume of 0.56 cubic centimeters per gram, and an average pore diameter of 90 Angstroms.

EXAMPLE II

This example is a comparative example and, taken with Example I, illustrates the improvement derived from the method of this invention. In this example, the alumina hydrosol of Example I was admixed with an equal volume of 28% aqueous hexamethylenetetramine solution and formed into spheroidal alumina particles substantially as described. The calcined product in this instance had a surface area of 197 square meters per gram, an average pore volume of 0.62 cubic centimeters per gram, and an average pore diameter of 126 Angstroms.

I claim as my invention:

1. A method of manufacturing mixed eta and gamma alumina particles which comprises:
   a. admixing and suspending a finely divided eta alumina in an acid anion-containing alumina sol having an aluminum/acid anion ratio of from about 1:1 to about 1.5:1, said alumina being admixed with said sol in an amount to provide from about 20 to about 50 wt. % of the final alumina product;
   b. commingling the resulting sol with an ammonia precursor at below gelation temperature, said ammonia precursor being decomposable to ammonia with increasing temperature;
   c. dispersing the mixture as droplets in a hot oil bath effecting decomposition of said ammonia precursor and formation of hydrogel spheres therein;
   d. aging the spheres at an elevated temperature effecting decomposition of the residual ammonia precursor contained therein, and washing, drying and calcining the aged hydrogel spheres.

2. The method of claim 1 further characterized in that said acid anion-containing alumina sol is aluminum chloride sol.

3. The method of claim 1 further characterized in that said ammonia precursor is hexamethylenetetramine.

4. The method of claim 1 further characterized in that said ammonia precursor is hexamethylenetetramine and utilized in an amount to effect substantially complete neutralization of the acid anion contained in said mixture.

5. The method of claim 1 further characterized in that said ammonia precursor is hexamethylenetetramine and utilized in from about a 1:4 to about 1.25:4 mole ratio with said acid anion.

6. The method of claim 1 further characterized in that said oil bath is maintained at a temperature of from about 120° to about 220° F.

7. The method of claim 1 further characterized in that said hydrogel spheres are aged at a temperature of from about 120° to about 500° F. and at a pressure to maintain the water content thereof in a substantially liquid phase.

8. The method of claim 1 further characterized in that said hydrogel spheres are aged at a temperature of from about 120° to about 350° F. and a pressure of from about 40 to about 150 psig.

9. The method of claim 1 further characterized in that said aged hydrogel spheres are dried and calcined at a temperature of from about 800° to about 1400°F.

* * * * *